United States Patent [19]

Rauthmann et al.

[11] Patent Number: 4,533,169
[45] Date of Patent: Aug. 6, 1985

[54] SPARE WHEEL ARRANGEMENT IN MOTOR CARS

[75] Inventors: Axel Rauthmann; Harry Pietsch, both of Pulheim, Fed. Rep. of Germany

[73] Assignee: Ford Motor Company, Dearborn, Mich.

[21] Appl. No.: 561,395

[22] Filed: Dec. 14, 1983

[30] Foreign Application Priority Data

Dec. 24, 1982 [DE] Fed. Rep. of Germany ....... 3247979

[51] Int. Cl.$^3$ ............................................. B60P 3/22
[52] U.S. Cl. .................................. 296/37.2; 280/5 R; 224/42.12
[58] Field of Search ........................... 296/37.2, 37.14; 224/42.14, 42.2; 280/5 R

[56] References Cited

U.S. PATENT DOCUMENTS

| | | | |
|---|---|---|---|
| 3,595,335 | 7/1971 | Wessells, III et al. | 296/37.2 |
| 4,060,270 | 11/1977 | Croissant | 296/37.2 |
| 4,423,900 | 1/1984 | Sugimoto et al. | 296/37.2 |

FOREIGN PATENT DOCUMENTS

| | | |
|---|---|---|
| 35739 | 9/1981 | European Pat. Off. . |
| 2046251 | 2/1977 | Fed. Rep. of Germany . |
| 2827855 | 9/1979 | Fed. Rep. of Germany . |

*Primary Examiner*—Robert R. Song
*Attorney, Agent, or Firm*—Daniel M. Stock; Clifford L. Sadler

[57] ABSTRACT

There is described a spare wheel arrangement for a motor car, in which the spare wheel and the fuel tank are disposed adjacent one another below the rear loading area in a partly overlapping manner and in which the spare wheel is disposed in a depression in the floor and the fuel tank is disposed below the floor by means of support straps, the spare wheel having a tendency to rise at its forward end from the depression in the case of a rear-end collision.

The front end of the depression 6 is covered by a capture plate 12 which, in the case of a rear end collision at relatively low speeds, acts in conjunction with the rim 10 of the spare wheel 7 to brace the floor against excessive deformation which would endanger the fuel tank.

2 Claims, 3 Drawing Figures

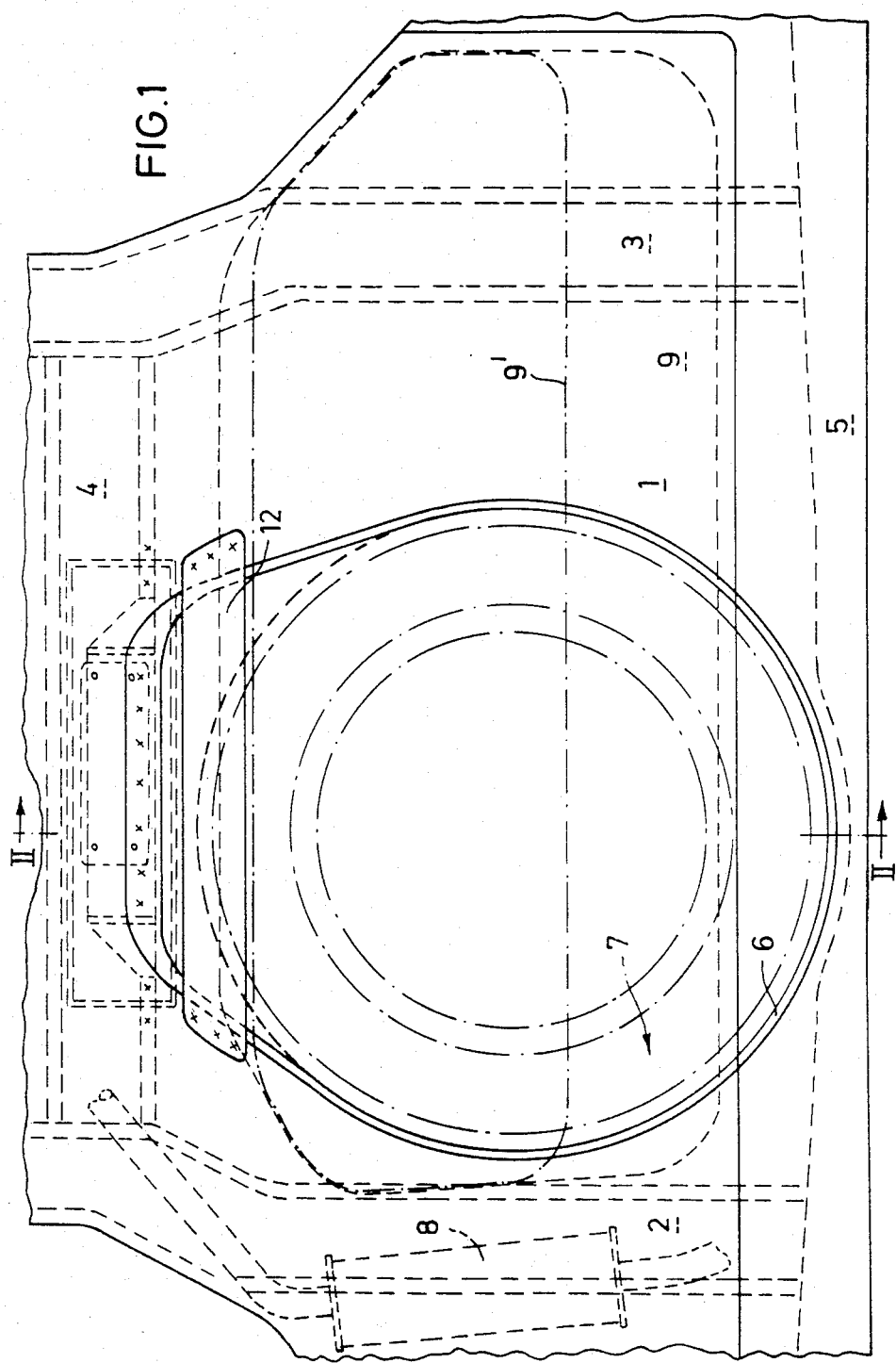

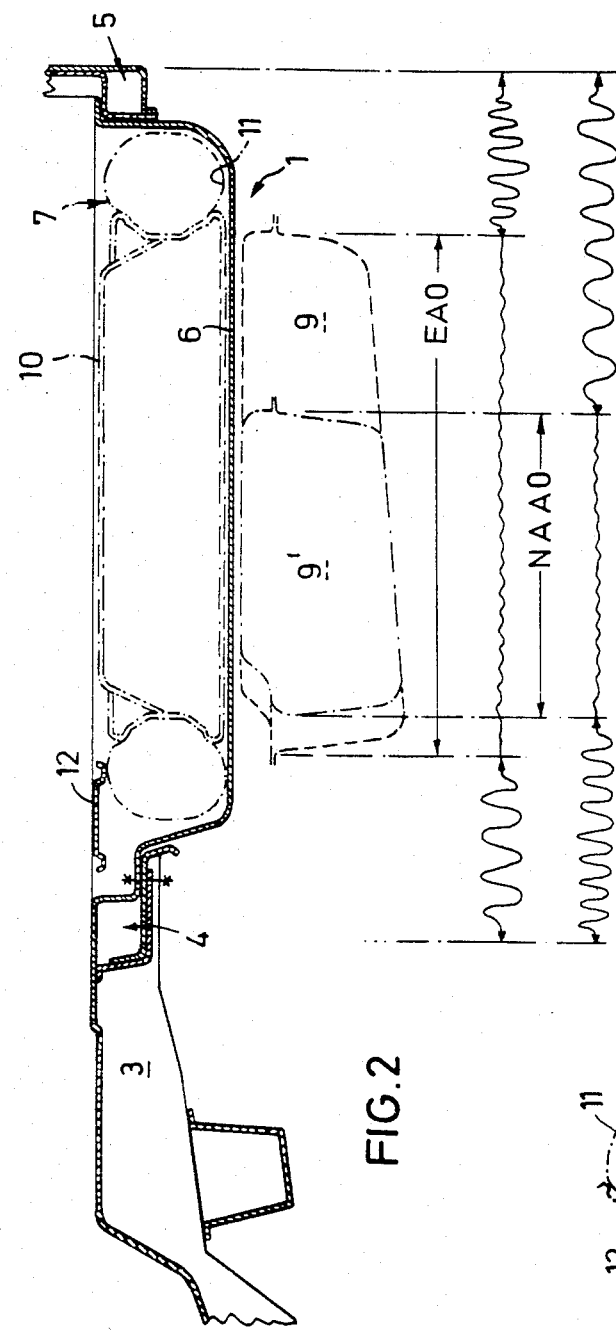
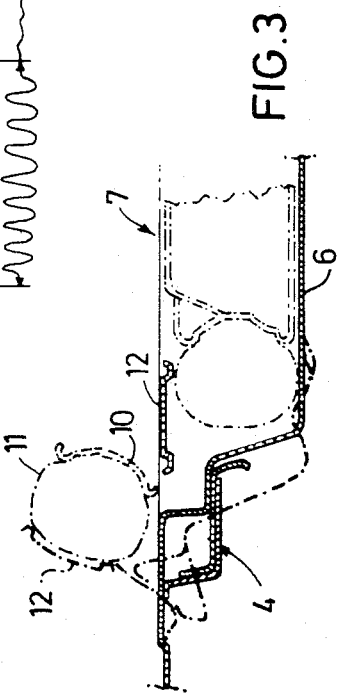

SPARE WHEEL ARRANGEMENT IN MOTOR CARS

BACKGROUND OF THE INVENTION

The invention relates to a spare wheel arrangement for a motor car in which the spare wheel and the fuel tank are disposed adjacent one another below the rear loading area in a partly overlapping manner and in which the spare wheel is disposed in a depression in the floor and the fuel tank is disposed below the floor by means of support straps, the spare wheel having a tendency to rise at its forward end from its depression in the case of a rear-end collision.

DESCRIPTION OF THE PRIOR ART

Various spare wheel arrangements of this type are known from the European Patent Publication No. 0 035 739.

German Patent Specification No. 20 46 251, and German Auslegeschrift No. 28 27 855 disclose further spare wheel arrangements in which means are provided for enabling the spare wheel to be rapidly raised from its depression in the event of a rear-end collision so that its comparatively rigid rim does not endanger the fuel tank disposed behind it.

The means proposed for these known spare wheel arrangements involve the spare wheel and fuel tank being disposed behind one another and, therefore, lead to a comparatively large overhang at the rear of the vehicle.

SUMMARY OF THE INVENTION

In the design of motor vehicles intended to be sold internationally, it is necessary to be able to comply with the safety regulations in effect in different countries without major structural alterations to the vehicle design. The present invention seeks to provide a spare wheel arrangement which permits the requirements relating to safety in the event of rear-end collisions in effect in Europe and in the United States of America to be satisfied with a comparatively short rear overhang of the vehicle body beyond the rear axle.

In accordance with the present invention, there is provided a spare wheel arrangement for a motor car in which the spare wheel and the fuel tank are disposed adjacent one another below the rear loading area in a partly overlapping manner and in which the spare wheel is disposed in a depression in the floor and the fuel tank is disposed below the floor by means of support straps, the spare wheel having a tendency to rise at its forward end from the depression in the event of a rear-end collision. The front end of the depression is covered by a retaining plate which, in the case of a rear-end collision at relatively low speeds, acts in conjunction with the rim of the spare wheel to brace the floor against excessive deformation which would endanger the fuel tank.

Preferably, the retaining plate is rigidly connected to a girder extending transversely above the vehicle rear axle in such a manner that in the event of a collision at higher speeds, the depression and the girder both deform to absorb and dissipate the energy of the collision.

In the preferred embodiment of the invention, because the front end of the spare wheel depression is covered by a retaining plate which prevents the spare wheel from sliding out at relatively low impact speeds and because the wheel rim is supported on a transverse girder disposed in front of the depression, after deformation of the depression, the energy resulting from the impact dissipated by deformation is substantially absorbed solely by the areas of the longitudinal girders and the floor which are disposed behind and in front of the area in which the spare wheel and fuel tank are disposed. The longitudinal dimension of the fuel tank may be approximately equal to the diameter of the rim of the spare wheel while satisfying the European safety requirements (impact at 23 mph or 40 km/h).

If the retaining plate acts upon the spare wheel depression and possibly on both longitudinal girders at the rear of the vehicle in such a way that the latter are included in the deformation at higher impact speeds (impact at more than 30 mph–50 km/h), then the energy to be dissipated by deformation in the case of a rear-end collision is not only absorbed by the areas of the floor lying behind and in front of the area in which the spare wheel is located, but also by deformation of the area of the floor comprising the spare wheel depression. This occurs as a result of the fact that the ability of the spare wheel to slip out of its depression is limited by the retaining plate. The length of a fuel tank in the longitudinal direction of the vehicle for a vehicle which must satisfy the stricter safety requirements of the United States of America need, therefore, only be a little less than the diameter of the spare wheel rim to prevent excessive deformation of the area of the floor in which the fuel tank is located. The required path of deformation of the bodywork may be ensured, therefore, once the spare wheel rim transmits the forces to the rear portions of the wheel depression and the rear transverse girder and the retaining plate which are designed for a corresponding energy dissipating deformation.

The spare wheel arrangement provides the advantage for cars which are designed for both the European and American market that it is no longer necessary to construct two different bodywork variants with rear overhangs of different sizes. It is necessary, however, to provide different arrangements of the fuel tank while the bodywork structures remain substantially identical. An unacceptable deformation of the fuel tank is prevented by the bracing of the spare wheel or the spare wheel rim, economic designs fabricated from plastic may be selected for the fuel tank which may extend over the entire width of the floor between the longitudinal girders and partly below the spare wheel depression.

BRIEF DESCRIPTION OF THE DRAWINGS

The invention will now be described further, by way of example, with reference to the accompanying drawings, in which:

FIG. 1 is a plan view of the floor of the loading area of a car;

FIG. 2 is a section along the line II—II of FIG. 1, which shows below the section the constructionally required paths of deformation, those relating to European safety requirements and those relating to the stricter safety requirements of the United States of America; and FIG. 3 is a partial section through the front area of the spare wheel arrangement after a rear-end collision at a high impact speed.

DESCRIPTION OF THE PREFERRED EMBODIMENTS

In the drawings, a depression 6 for receiving the spare wheel 7 (which is horizontally disposed) is formed in a floor 1 in the rear area of a motor car. The depression lies transversely between longitudinal girders 2 and 3 while it is disposed longitudinally between a transverse girder 4 or rear bulkhead lying above the rear axle and a further transverse girder 5 disposed at the end of the vehicle body.

The floor 1 has disposed below it on one side a muffler 8 shown in dashed lines, and on the other side a fuel tank 9 (also shown in dashed lines) which partly overlaps the depression 6 for the spare wheel 7.

As can be seen from FIG. 2, fuel tanks having different capacities may be used, their lengths measured along the vehicle axis being different.

The fuel tank 9 shown in dashed lines extends in the longitudinal direction of the vehicle approximately over the area of the rim diameter of the spare wheel 7, the wheel comprising in the usual manner a rim 10 and a tire 11.

As the end of the vehicle with the transverse girder 5 is directly deformed in the case of a rear-end collision, the tire 11 of the spare wheel 7 is immediately punctured and deflated as a result of the strong force applied to it. The rear end of the depression 6 is then deformed and slides the rim 10 to the front end of the depression 6. The transverse girder 4 lying above the rear axle is arranged ahead of the depression 6, and prevents an excessive deformation of the depression 6 in the floor 1, so that the fuel tank disposed therebelow may be protected against destruction. If desired, the front end of the depression may rest against the girder 4 before deformation has taken place.

In the case of European safety provisions, which provide for a comparatively low impact speed, the length of the fuel tank 9 measured along the vehicle axis may, therefore, correspond approximately to the diameter of the rim 10 of the spare wheel 7.

If a rear-end collision taking place at a higher impact speed is to be allowed for, as prescribed in the safety regulations of the United States of America, a greater deformation path must be provided in order to dissipate the energy produced thereby. For this purpose the retaining plate 12 is disposed so as to cover the front end of the depression 6 of the spare wheel 7 and is connected with the floor above the rear axle in a manner enabling the transmission of force. The front end of the depression 6 may in this respect solely be adapted in a known manner to the shape of the spare wheel 7 or may comprise, also in a known manner, an inclined area which facilitates rising of the spare wheel 7. This is dependent on the deformation behavior of the rear portion of the vehicle bodywork as many bodywork structures, as is known, are downwardly deformed in the case of a rear-end collision in the first instance and, therefore, initiate raising of the spare wheel 7.

Although in the case of a rear-end collision at a higher impact speed, the first phase of the deformation takes place substantially in accordance with the development described above, it continues to the support of the rim 10 of the spare wheel 7, to the retaining plate 12 and to the transverse girder 4, as this area is deformed approximately as shown in a thick dot-dash lines in FIG. 3. The rim 10 is prevented by the retaining plate 12 from moving completely freely into the loading area of the vehicle so that its other end braces the forward pressing rear end of the depression 6 of the spare wheel 7. Although a greater deformation of the floor 1 takes place in the rear area of the depression for the spare wheel 7, the extent of this deformation is influenced and limited by the arrangement and design of the retaining plate 12 in conjunction with the transverse girder 4.

The length of the fuel tank may amount in this case to approximately two-thirds of the rim diameter (as indicated at 9'), since deformation of the rear area of the floor 1 comprising the depression 6 for the spare wheel 7 is approximately limited to this value by the comparatively rigid rim 10 and the restriction of its movement by the retaining plate 12. The fuel tank is therefore protected against damage.

In the two modes of deformation of the bodywork structure given under FIG. 2 for the two different impact speeds, the wavy lines with a greater amplitude show the areas which are deformed to a comparatively large extent, and the wavy lines with the small amplitude show the areas which are only slightly deformed. It can be clearly seen that in both applications the area of the floor below which the fuel tank is disposed is safeguarded from undesirably high deformation levels. The low impact speed condition is labelled EAO, and the high impact speed condition is labelled NAAO in this Figure.

What is claimed is:

1. A spare wheel arrangement for a motor car in which the spare wheel having a rigid rim and the fuel tank are disposed adjacent one another below the motor car rear loading area in a partly overlapping manner, and in which the spare wheel is disposed in a depression in the floor and the fuel tank is disposed below the floor, the spare wheel having a tendency to rise at its forward end from the depression in the case of a rear-end collision, characterized in that the front end of the depression is covered by a retaining plate which, in the event of a rear-end collision at relatively low speeds, acts in conjunction with the rim of the spare wheel to brace the floor against excessive deformation.

2. A spare wheel arrangement as defined in claim 1, further characterized in that the retaining plate is rigidly abuttingly connectable with a girder extending transversely above the vehicle rear axle in such a manner that in the event of a collision at higher speeds the depression and the girder both deform to absorb and dissipate the energy of the collision.

* * * * *